(12) United States Patent
Munetomo

(10) Patent No.: US 8,312,124 B2
(45) Date of Patent: Nov. 13, 2012

(54) FIXED FORM DATA MANAGEMENT SERVER APPARATUS AND FIXED FORM DOCUMENT CREATING SYSTEM

(75) Inventor: Hiroki Munetomo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 258 days.

(21) Appl. No.: 12/633,234

(22) Filed: Dec. 8, 2009

(65) Prior Publication Data

US 2010/0161782 A1     Jun. 24, 2010

(30) Foreign Application Priority Data

Dec. 19, 2008   (JP) ................ 2008-323377

(51) Int. Cl.
*G06F 15/173* (2006.01)
(52) U.S. Cl. ............ 709/223; 709/203; 705/1; 713/168; 358/1.13
(58) Field of Classification Search .................. 709/223, 709/203; 705/1; 713/168
See application file for complete search history.

(56) References Cited

U.S. PATENT DOCUMENTS

| | | | |
|---|---|---|---|
| 7,895,262 B2* | 2/2011 | Nielsen et al. | 709/203 |
| 2005/0157321 A1* | 7/2005 | Alacar | 358/1.13 |
| 2005/0267772 A1* | 12/2005 | Nielsen et al. | 705/1 |
| 2006/0256372 A1 | 11/2006 | Suzuki | |
| 2008/0297833 A1 | 12/2008 | Hatakeyama | |
| 2010/0122088 A1* | 5/2010 | Oxford | 713/168 |

FOREIGN PATENT DOCUMENTS

| | | |
|---|---|---|
| CN | 101315596 A | 12/2008 |
| JP | 2000-076228 | 3/2000 |
| JP | 2001-067346 | 3/2001 |
| JP | 2006-344210 | 12/2006 |
| JP | 2007-076162 | 3/2007 |

* cited by examiner

*Primary Examiner* — Tammy Nguyen

(74) *Attorney, Agent, or Firm* — Renner, Otto, Boisselle & Sklar, LLP

(57) ABSTRACT

The present invention provides a fixed form data managing server apparatus that automatically checks whether the version of the fixed form data included in document data created on a PC is the latest version and that transmits the check result to the PC. Prior to printing of the created document data by an image forming apparatus, the PC transmits the version information of the fixed form data included in the document data through the printing server apparatus. The fixed form data managing server apparatus that has received the version information determines whether the version information is the latest version information and, when the apparatus determines that the version information is not the latest one, transmits control information to stop the printing of the document data to the PC.

7 Claims, 15 Drawing Sheets

FIG. 4A

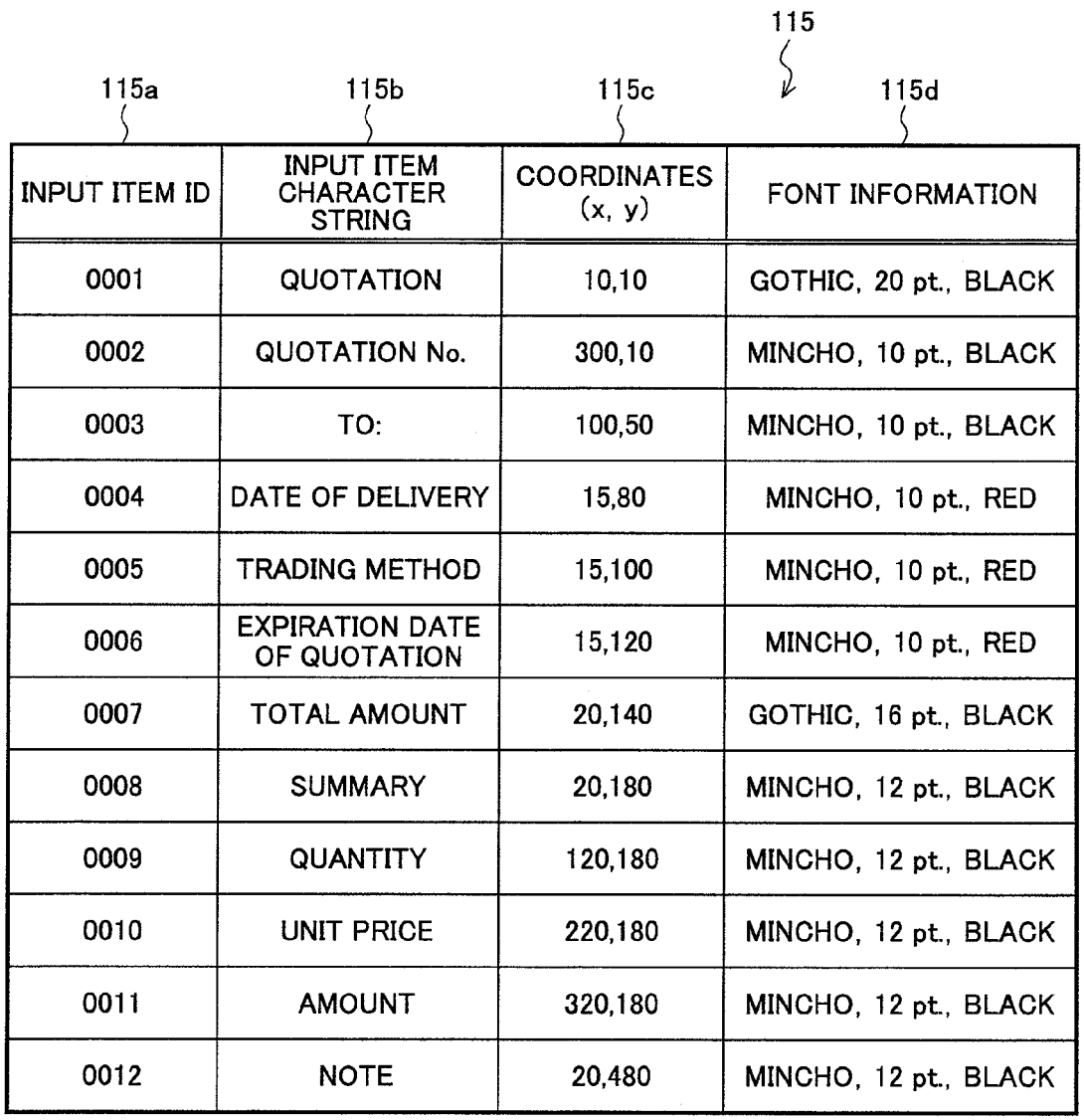

| INPUT ITEM ID | INPUT ITEM CHARACTER STRING | COORDINATES (x, y) | FONT INFORMATION |
|---|---|---|---|
| 0001 | QUOTATION | 10,10 | GOTHIC, 20 pt., BLACK |
| 0002 | QUOTATION No. | 300,10 | MINCHO, 10 pt., BLACK |
| 0003 | TO: | 100,50 | MINCHO, 10 pt., BLACK |
| 0004 | DATE OF DELIVERY | 15,80 | MINCHO, 10 pt., RED |
| 0005 | TRADING METHOD | 15,100 | MINCHO, 10 pt., RED |
| 0006 | EXPIRATION DATE OF QUOTATION | 15,120 | MINCHO, 10 pt., RED |
| 0007 | TOTAL AMOUNT | 20,140 | GOTHIC, 16 pt., BLACK |
| 0008 | SUMMARY | 20,180 | MINCHO, 12 pt., BLACK |
| 0009 | QUANTITY | 120,180 | MINCHO, 12 pt., BLACK |
| 0010 | UNIT PRICE | 220,180 | MINCHO, 12 pt., BLACK |
| 0011 | AMOUNT | 320,180 | MINCHO, 12 pt., BLACK |
| 0012 | NOTE | 20,480 | MINCHO, 12 pt., BLACK |

| INPUT AREA ID | CORRESPONDING INPUT ITEM ID | COORDINATES (x, y) |
|---|---|---|
| 0001 | 0002 | 330,10 |
| 0002 | 0003 | 10,50 |
| 0003 | 0004 | 50,80 |
| 0004 | 0005 | 50,100 |
| 0005 | 0006 | 50,120 |
| 0006 | 0007 | 50,140 |
| 0007 | 0008 | 20,220 |
| 0008 | 0009 | 120,220 |
| 0009 | 0010 | 220,220 |
| 0010 | 0011 | 320,220 |
| 0011 | 0012 | 28,480 |

| RULED LINE ID | COORDINATES (x1,y1,x2,y2) | STYLE INFORMATION |
|---|---|---|
| 0001 | 10,10,50,30 | BOXLINE, 1.5 pt., DOUBLE SOLID |
| 0002 | 20,140,100,140 | LINE, 0.8 pt., DOTTED LINE, BLACK |
| 0003 | 20,180,100,180 | LINE, 0.8 pt., DOTTED LINE, BLACK |
| 0004 | 300,140,380,180 | BOXLINEFILL, 0.8 pt., DOT |
| 0005 | 340,140,340,180 | LINE, 0.8 pt., DOTTED LINE, BLACK |
| 0006 | 20,470,340,470 | LINE, 1.5 pt., SOLID LINE, BLACK |

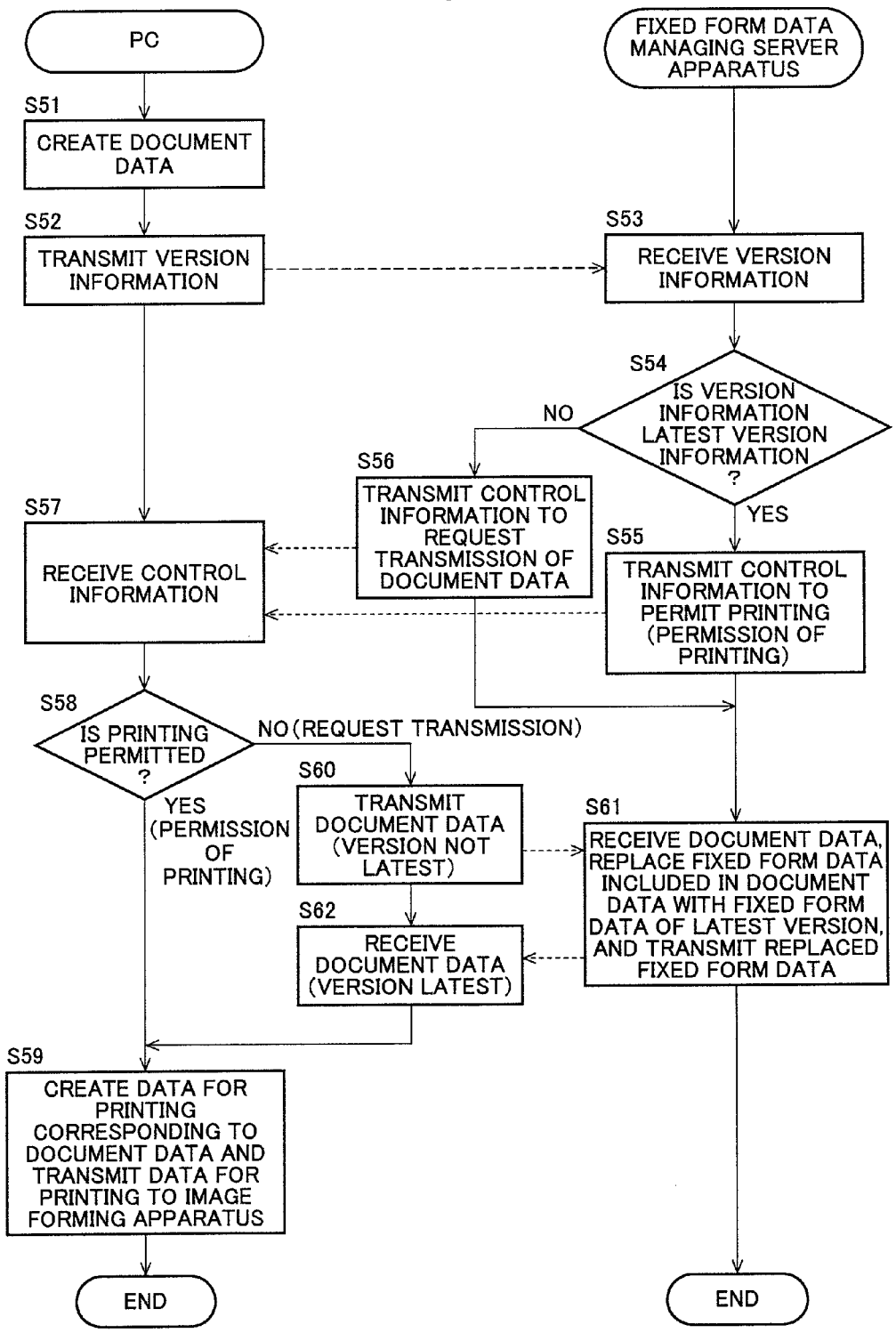

FIXED FORM DATA MANAGEMENT SERVER APPARATUS AND FIXED FORM DOCUMENT CREATING SYSTEM

CROSS-NOTING PARAGRAPH

This non-provisional application claims priority under 35 U.S.C. §119 (a) on Patent Application No. 2008-323377 filed in JAPAN on Dec. 19, 2008, the entire contents of which are hereby incorporated herein by reference.

FIELD OF THE INVENTION

The present invention relates to a fixed form data management server apparatus that executes a check on the version of data of a fixed form.

BACKGROUND OF THE INVENTION

Conventionally, when a document (data) such as a bill or a greeting letter that is configured based on a form having therein a title, various items to be input, etc., of the document that are fixed, is created using office-use application software such as, for example, word processor software, spreadsheet software, or presentation software, fixed form data (a so-call template) that is prepared in advance and that constitutes a fixed form is used for the purpose of facilitating simplification of the creating work.

A user inputs text data such as characters and values that correspond to the various items to be input in the fixed form data, based on the fixed form data and, thereby, the user may easily create fixed form document data (hereinafter, "document data").

In the case where fixed form data is updated (renewed to that of an upgraded version) due to increase of the number of items to be input of the fixed form data, etc., even when document data is created and is printed based on the existing fixed form data, the creation and the printing of the document data are wasted because the document data is not adapted to the latest fixed form.

A method has been proposed of automatically correcting document data even when the document data is created based on fixed form data that exists before its updating, such that the document data is adapted to the updated fixed form data (see, e.g., Japanese Laid-Open Patent Publication No. 2000-76228).

However, when the above automatic correcting method is executed by a server apparatus, the creating process of the document data executed on a PC (Personal Computer) has to be always monitored and, therefore, a problem has risen that the processing load is increased.

Especially, an unnecessary processing load is imposed on the server apparatus and the PC because the above monitoring process is executed even when the fixed form data is not updated.

In the above case, it is considered to be preferable that whether the version of the fixed form data included in the document data is the latest version may be checked, for example, before printing of the document data created.

SUMMARY OF THE INVENTION

The object of the present invention is to provide a fixed form data managing server apparatus that automatically checks whether the version of the fixed form data included in document data created on a PC is the latest version and that transmits the result thereof to the PC.

Another object of the present invention is to provide a fixed form data managing server apparatus in a fixed form creating system comprising a fixed form data managing server apparatus that manages fixed form data constituting a fixed form attached with version information and having various input items set therein, and an information processing apparatus that transmits document data into which text data corresponding to the various input items of the fixed form data is input based on the fixed form data, comprising: a recording portion that has recorded therein the fixed form data attached with the version information and updated when necessary; and a determining portion that compares version information of the fixed form data transmitted from the information processing apparatus with the version information attached to the fixed form data recorded in the recording portion and that determines whether the version information of the fixed form data transmitted from the information processing apparatus is the version information attached to the fixed form data recorded in the recording portion, wherein when the determining portion determines that the version information of the fixed form data transmitted from the information processing apparatus is not the version information attached to the fixed form data recorded in the recording portion, the fixed form data managing server apparatus transmits control information to stop printing of the document data to the information processing apparatus.

Another object of the present invention is to provide the fixed form data managing server apparatus, wherein the fixed form data managing server apparatus transmits the control information to stop the printing of the document data to the information processing apparatus and further transmits recording destination information of the fixed form data recorded in the recording portion or the fixed form data recorded in the recording portion to the information processing apparatus.

Another object of the present invention is to provide the fixed form data managing server apparatus, wherein when the determining portion determines that the version information of the fixed form data transmitted from the information processing apparatus is not the version information attached to the fixed form data recorded in the recording portion, the fixed form data managing server apparatus transmits to the information processing apparatus control information to request the information processing apparatus to transmit the document data created based on the fixed form data instead of the control information to stop the printing of the document data, replaces the fixed form data in the document data transmitted from the information processing apparatus with the fixed form data attached with the version information recorded in the recording portion, and transmits the replaced fixed form data to the information processing apparatus.

Another object of the present invention is to provide the fixed form data managing server apparatus, wherein when the determining portion receives the version information of the fixed form data, the determining portion obtains performance information of an image forming apparatus that is designated as an output destination of the document data concerning the fixed form data from the image forming apparatus, determines whether the image forming apparatus is capable of executing printing conditions set for the document data concerning the fixed form data by referring to the performance information, and, thereafter, transmits the determination result to the information processing apparatus.

Another object of the present invention is to provide a fixed form document creating system comprising: the fixed form data managing server apparatus and an information processing apparatus that has a function of transmitting document data created based on fixed form data, the information processing apparatus transmitting version information of the fixed form data to the fixed form data managing server apparatus, wherein the fixed form data managing server apparatus and the information processing apparatus are connected to each other through a network.

Another object of the present invention is to provide the fixed form document creating system, wherein the information processing apparatus that has received the control information to stop the printing of the document data transmitted by the fixed form data managing server apparatus displays a dialogue to inform a user that the fixed form data included in the document data is not that of the latest version.

Another object of the present invention is to provide the fixed form document creating system, wherein the information processing apparatus is configured by a personal computer or a facsimile apparatus.

BRIEF DESCRIPTION OF THE DRAWINGS

FIGS. 4A to 4C are diagrams of examples of data tables;

FIG. 14 is an explanatory flowchart of the fixed form data replacing process.

PREFERRED EMBODIMENTS OF THE INVENTION

First Embodiment

Figure 1:
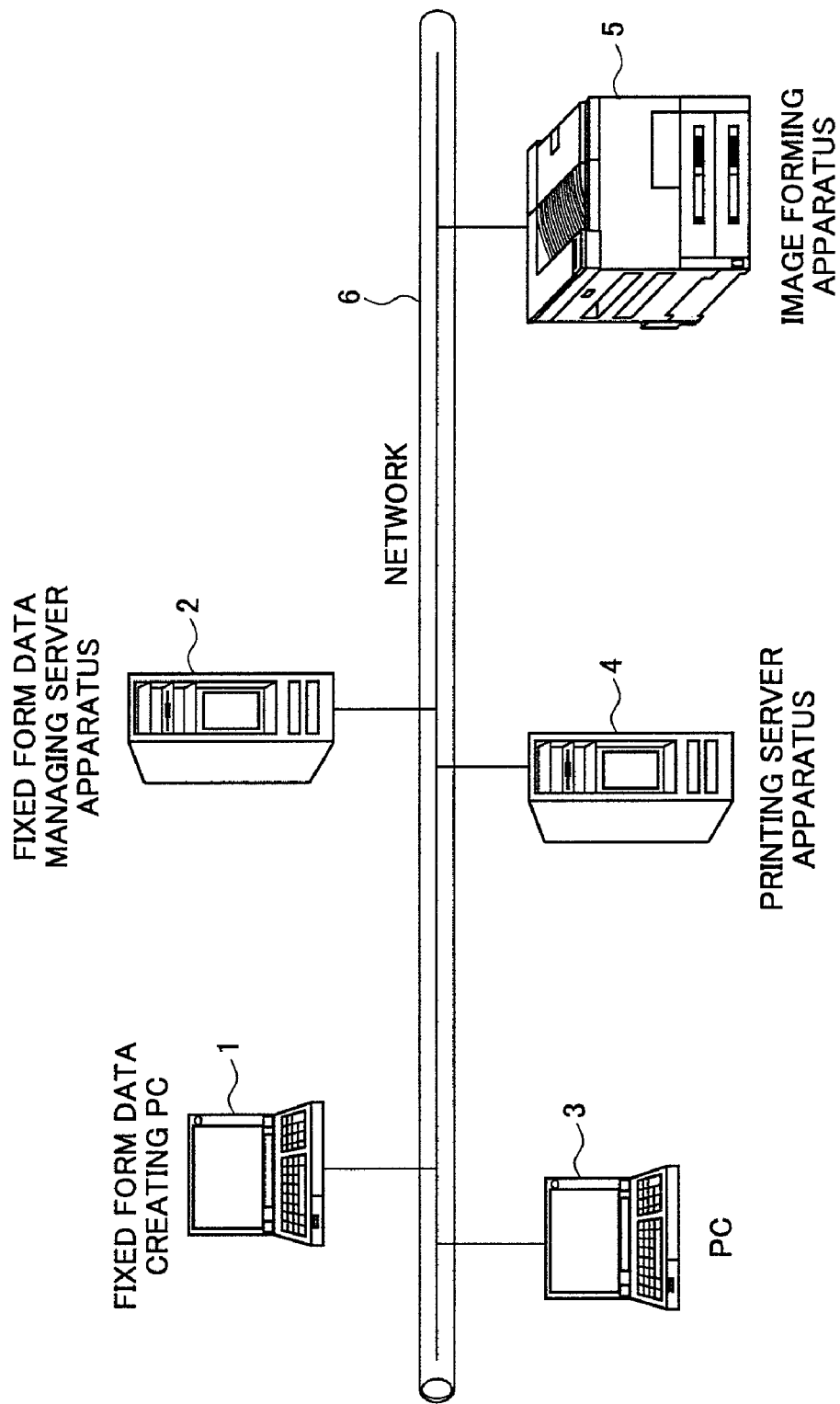
FIG. 1 is an explanatory diagram of the overview of the present invention.

FIG. 1 is an explanatory diagram of the overview of the present invention.

"1" denotes a fixed form data creating PC to create fixed form data that is attached with version information and that constitutes a fixed form having various input items set therein.

"2" denotes a fixed form data managing server apparatus according to the present invention that records and manages fixed form data created by the fixed form data creating PC 1, and various types of information on the data such as, for example, the version information (the version number) of the fixed form data. The detail of the fixed form data will be described later.

"3" denotes a PC (information processing apparatus) that downloads the fixed form data attached with the version information from the fixed form data managing server apparatus 2, and that creates document data by inputting text data that corresponds to various input items of the fixed form data. The detail of the document data will be described later.

The fixed form data managing server apparatus 2 and the PC 3 constitute a fixed form creating system.

"4" denotes a printing server apparatus that temporarily has stored therein data for printing and that transmits the data for printing to an image forming apparatus 5.

The PC 3 transmits through the printing server apparatus 4 the version information of the fixed form data included in the document data, for example, prior to the printing of the created document data by the image forming apparatus 5. The fixed form data managing server apparatus 2 receives the version information and determines whether the version information is the latest version information. When the fixed form data managing server apparatus 2 determines that the version information is not the latest version information, the apparatus 2 transmits control information to stop the printing of the document data to the PC 3.

The PC 3 receives the control information, displays a dialogue informing a user that the fixed form data included in the document data to be printed is not the fixed form data of the latest version, and stops transmitting the document data to the image forming apparatus 5.

The fixed form data creating PC 1, the fixed form data managing server apparatus 2, the PC 3, the printing server apparatus 4, and the image forming apparatus 5 as above are mutually connected to each other through a network 6.

The printing server apparatus 4 is provided to reduce the load of the printing process and, therefore, is not always necessary.

Figure 2:
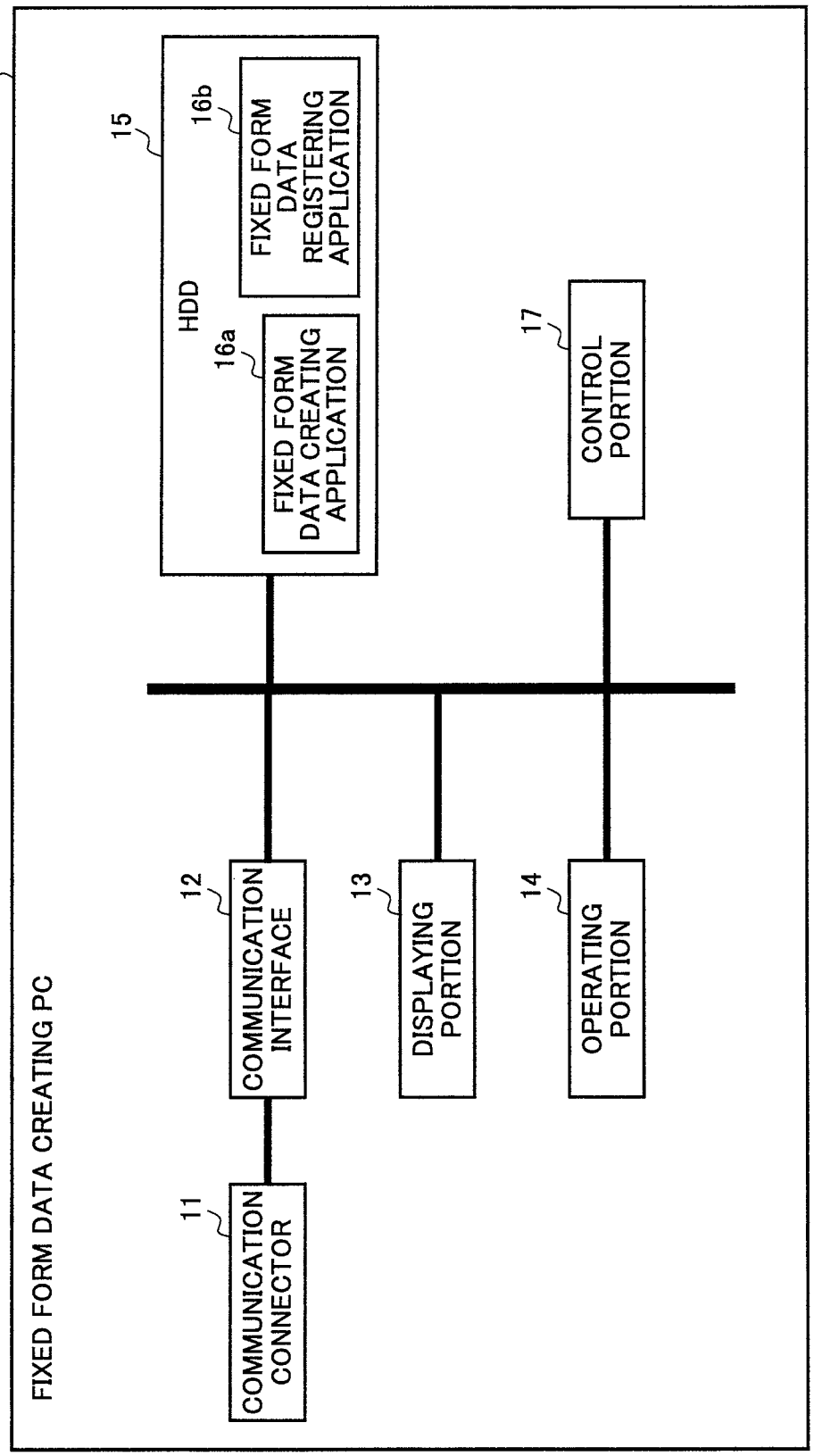
FIG. 2 is a functional block diagram of a fixed form data creating PC.

FIG. 2 is a functional block diagram of the fixed form data creating PC 1.

"11" denotes a communication connector that provides a function of connecting the PC 1 to a communication cable to connect the PC 1 using a network to external apparatuses such as the fixed form data managing server apparatus 2 and the PC 3.

"12" denotes a communication interface that executes communication process control between the PC 1 and the external apparatuses connected using a network through the communication connector 11.

"13" denotes a displaying portion configured by a liquid crystal displaying apparatus, etc. "14" denotes an operating portion configured by a keyboard, a mouse, etc.

"15" denotes an HDD (Hard Disk Drive) that functions as a large-capacity recording apparatus and that has temporarily stored therein fixed form data created by a fixed form data creating application (program) described later.

"16a" denotes the fixed form data creating application that newly creates fixed form data and that alters and updates the fixed form data already created.

"16b" denotes a fixed form data registering application that registers (uploads) the fixed form data created by the fixed form data creating application 16a into the fixed form data managing server apparatus 2.

The above fixed form data creating application 16a and the above fixed form data registering application 16b are recorded in the HDD 15.

"17" denotes a control portion that includes a CPU, a ROM, a RAM, etc., and that controls the functional blocks. The CPU controls a process of reading the fixed form data creating application 16a and the fixed form data registering application 16b into the RAM and executing the applications 16a and 16b.

Figure 3:
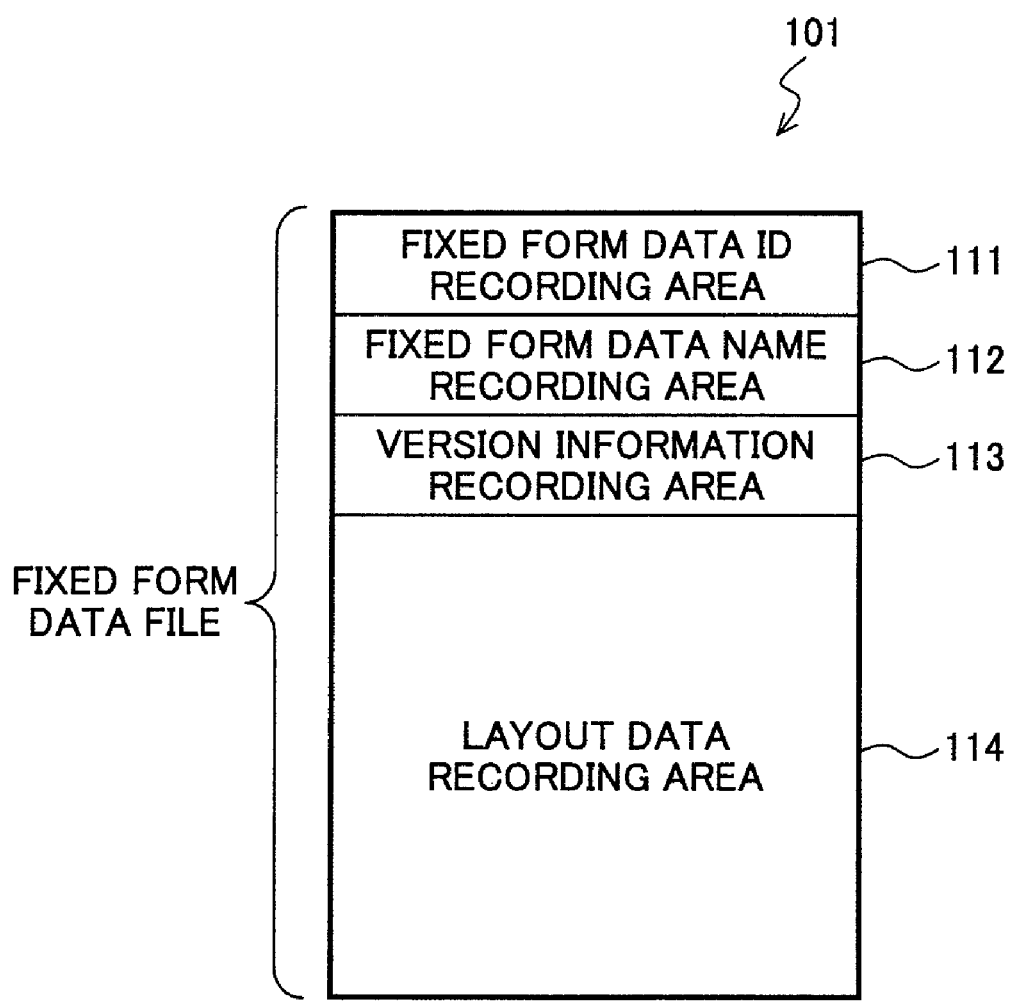
FIG. 3 is a diagram of an example of a data file of fixed form data.

FIG. 3 depicts an example of a data file of the fixed form data. A fixed form data file 101 includes a fixed form data ID recording area 111 that has recorded therein an ID to identify the data file 101, a fixed form data name recording area 112 that has recorded therein the name of the data file 101, a version information recording area 113 that has recorded therein the version information of the data file 101, and a layout data recording area 114 that has recorded therein the positions at which respective input items of the fixed form are disposed, etc.

FIG. 4A depicts the detail of a layout data table 115 recorded in the layout data recording area 114.

"115a" denotes input item ID columns that each have recorded therein the ID of an input item of the fixed form. "115b" denotes input item character string columns that each exhibit the input item (character string). "115c" denotes coordinate columns that each exhibit the coordinates for disposing the input items in the document data displaying area (on the paper). "115d" denotes font information columns that each exhibit font information concerning the character string of each input item, etc.

Figure 4B:

FIG. 4B depicts the detail of an input area data table 116 having recorded therein information to dispose in the document data displaying area text boxes provided for a user to input character strings and values therein corresponding to an input item identified by the input item ID column 115a.

"116a" denotes input area ID columns that each have recorded therein an input area ID to identify the text box (input area) provided for the user to input therein text data (document data) such as characters and values corresponding to the input item ID (input item character string). "116b" denotes corresponding input item ID columns that each have recorded therein the input item ID corresponding to the input item ID column 115a. "116c" denotes coordinate columns that each exhibit disposition coordinates in the document data displaying area of the text box.

Figure 4C:

FIG. 4C depicts the detail of a ruled line information data table 117 to be referred to when a ruled line is drawn in a fixed form document.

"117a" denotes ruled line ID columns that each have recorded therein an ID to identify a ruled line. "117b" denotes coordinate columns that each exhibit disposition coordinates (the coordinates of the starting point and the ending point) according to which a ruled line identified by the ruled line ID is drawn. "117c" denotes style information columns that each have recorded therein style information such as the font of the ruled line.

Ruled line information includes the pieces of information that are the ruled line ID, the disposition coordinates, and the ruled line style.

The ruled line style information has attributes such as an attribute to designate any one of a line (LINE) and a box (BOXLINE or BOXLINEFILL), an attribute to designate the thickness of a line, and a dotted line pattern or a solid line pattern, the color of a line, etc.

The fixed form data creating application 16a receives an order by a manager, etc., and creates the fixed form data file 101 depicted in FIG. 3 (FIGS. 4A to 4C). Thereafter, the fixed form data registering application 16b uploads the fixed form data file created, to the fixed form data managing server apparatus 2.

Figure 5:
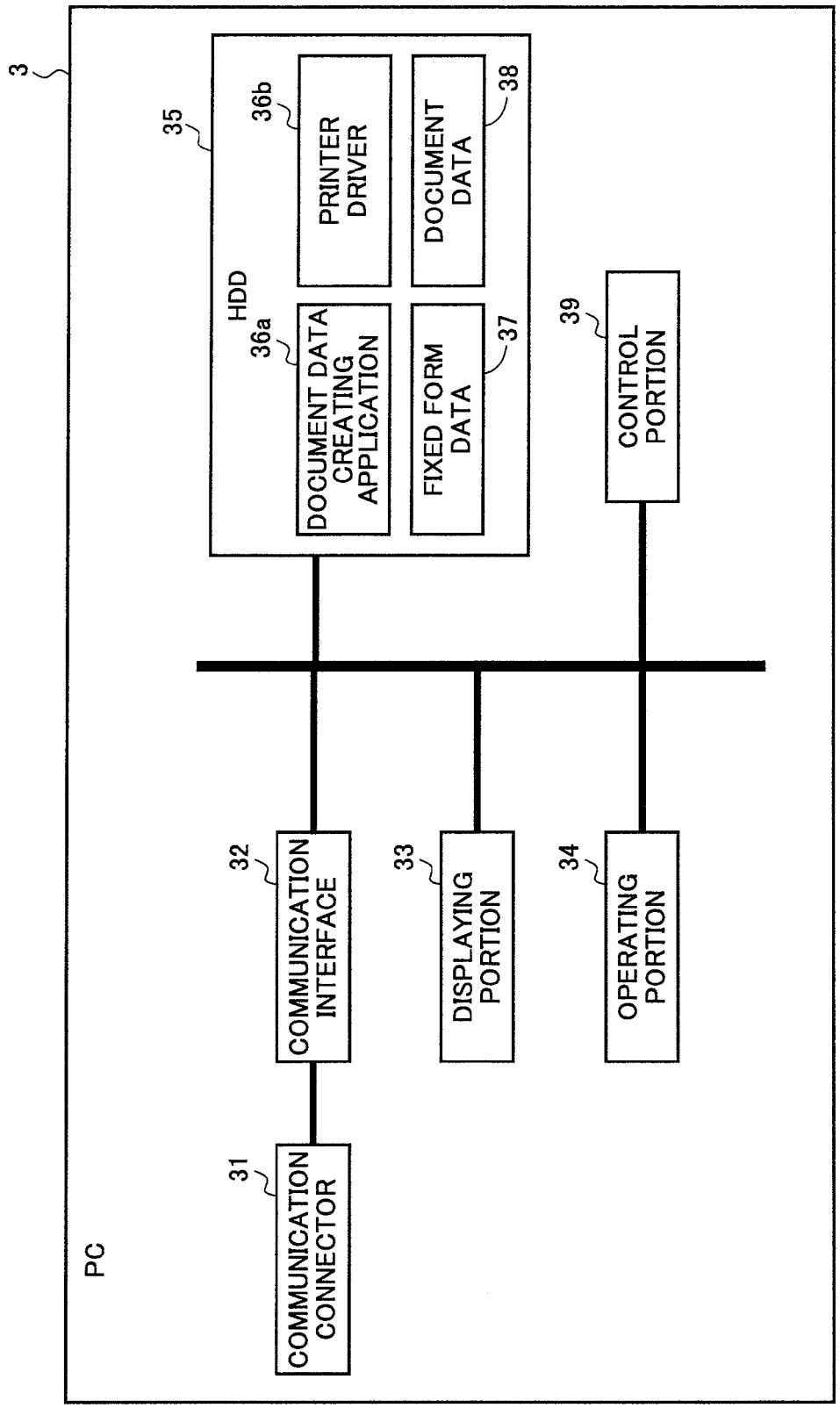
FIG. 5 is a functional block diagram of the PC.

FIG. 5 is a functional block diagram of the PC 3 having installed therein an application that creates document data whose input item columns are input with text data based on the above fixed form data (file).

"31" denotes a communication connector. "32" denotes a communication interface. "33" denotes a displaying portion. "34" denotes an operating portion.

"35" denotes an HDD that functions as a large-capacity recording apparatus and that has recorded therein document data, etc., created by a document data creating application described later.

"36a" denotes the document data creating application that executes a process of creating document data 38 based on fixed form data (file) 37 downloaded from the fixed form data managing server apparatus 2, etc.

"36b" denotes a printer driver that executes a process of creating data for printing corresponding to the document data and transmitting the data for printing to the printer server apparatus 4 through the communication interface 32, etc., when the printer driver 36b receives an order to print from the document data creating application 36a.

The document data creating application 36a, the printer driver 36b, the fixed form data 37, and the document data 38 are recorded in the HDD 35.

"39" denotes a control portion that includes a CPU, a ROM, a RAM, etc., and that controls the respective functional blocks. The CPU executes a process of reading the document data creating application 36a and the printer driver 36b in the RAM and executing the document data creating application 36a and the printer driver 36b.

Figure 6:
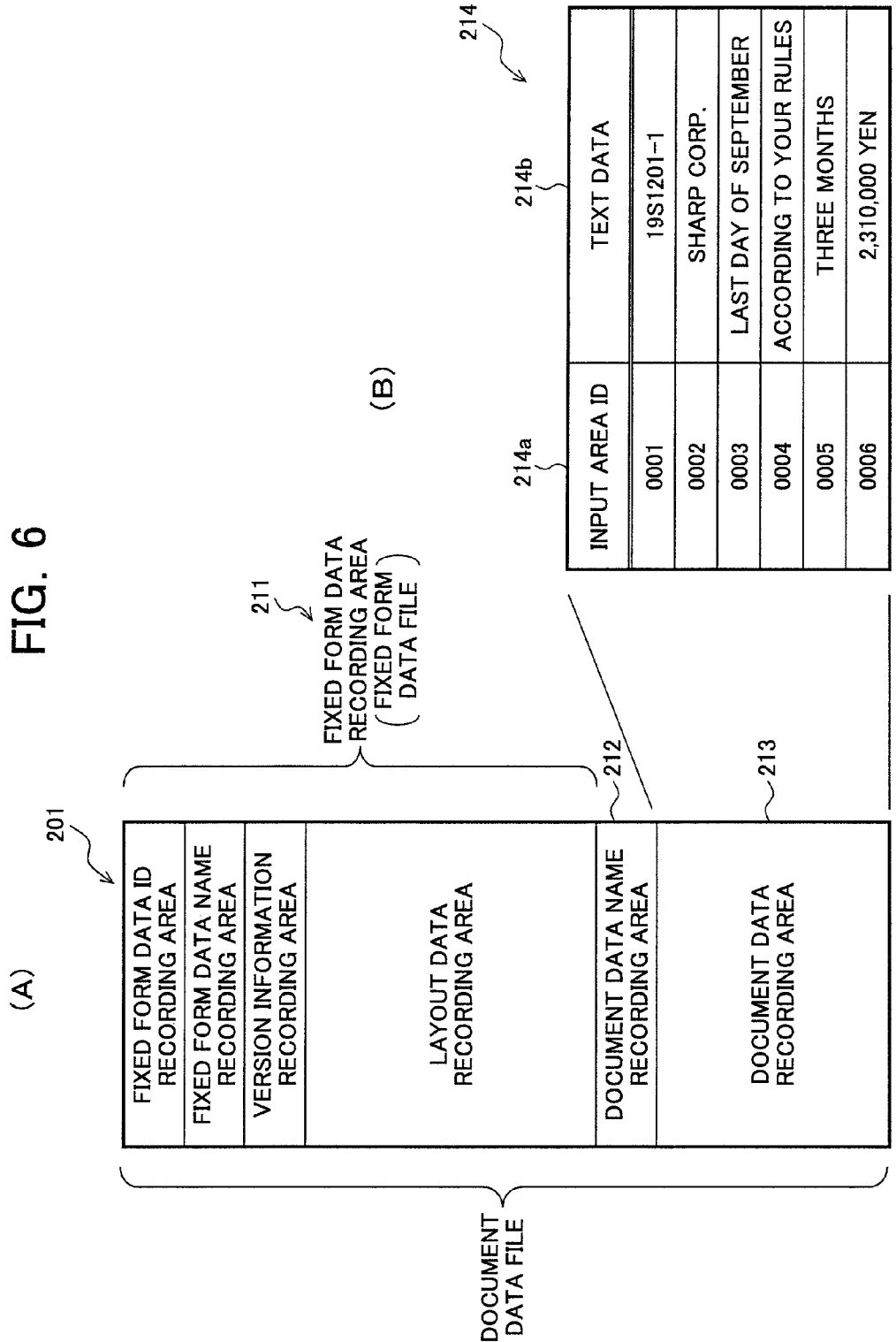
FIG. 6 is a diagram of an example of document data.

A portion (A) of FIG. 6 depicts an example of document data (file) 201 created by the document data creating application 36a and the document data 201 includes a fixed form data recording area 211 that corresponds to the fixed form data file 101, a document data name recording area 212, and a document data recording area 213.

A portion (B) of FIG. 6 depicts the detail of a document data table 214 that is recorded in the document data recording area 213.

"214a" denotes input area ID columns that each have recorded therein the input area ID corresponding to the input area ID depicted in FIG. 4B. "214b" denotes document data columns that each have recorded therein text data input into the input area (text box) by the user.

The document data creating application 36a receives the order by the user, etc., and creates the document data 201 (except the fixed form data) depicted in FIG. 6.

When the fixed form data file 101 (the fixed form data 37) is executed through the document data creating application 36a of the PC 3 (file opening), the document data creating application 36a disposes (displays) a character string of, for example, "Quotation No." (the input item ID in FIG. 4A: 0002) at the position of the coordinates (300, 10) in the document data displaying area (on the paper).

An input box to input text data that corresponds to the Quotation No. (the corresponding input item ID of FIG. 4B: 0002, input area ID: 0001) is disposed at the coordinates (330, 10).

When the user inputs text data, for example, "19S1201-1" into the input box disposed as above, using the keyboard, mouse, etc., of the operating portion 34, the document data creating application 36a creates the document data 201 as depicted in FIG. 6 (see the input area ID: 0001 of the document data table 214).

In this manner, the user sequentially inputs the pieces of text data into the respective input boxes and, thereby, the document data creating application 36a creates the document data (file).

When the data is printed after the creation of the document data comes to an end, the document data creating application 36a, before the printing, transmits the version information of the fixed form data recorded in the version information recording area 113 of FIG. 3, to the fixed form data managing server apparatus 2.

Figure 7:
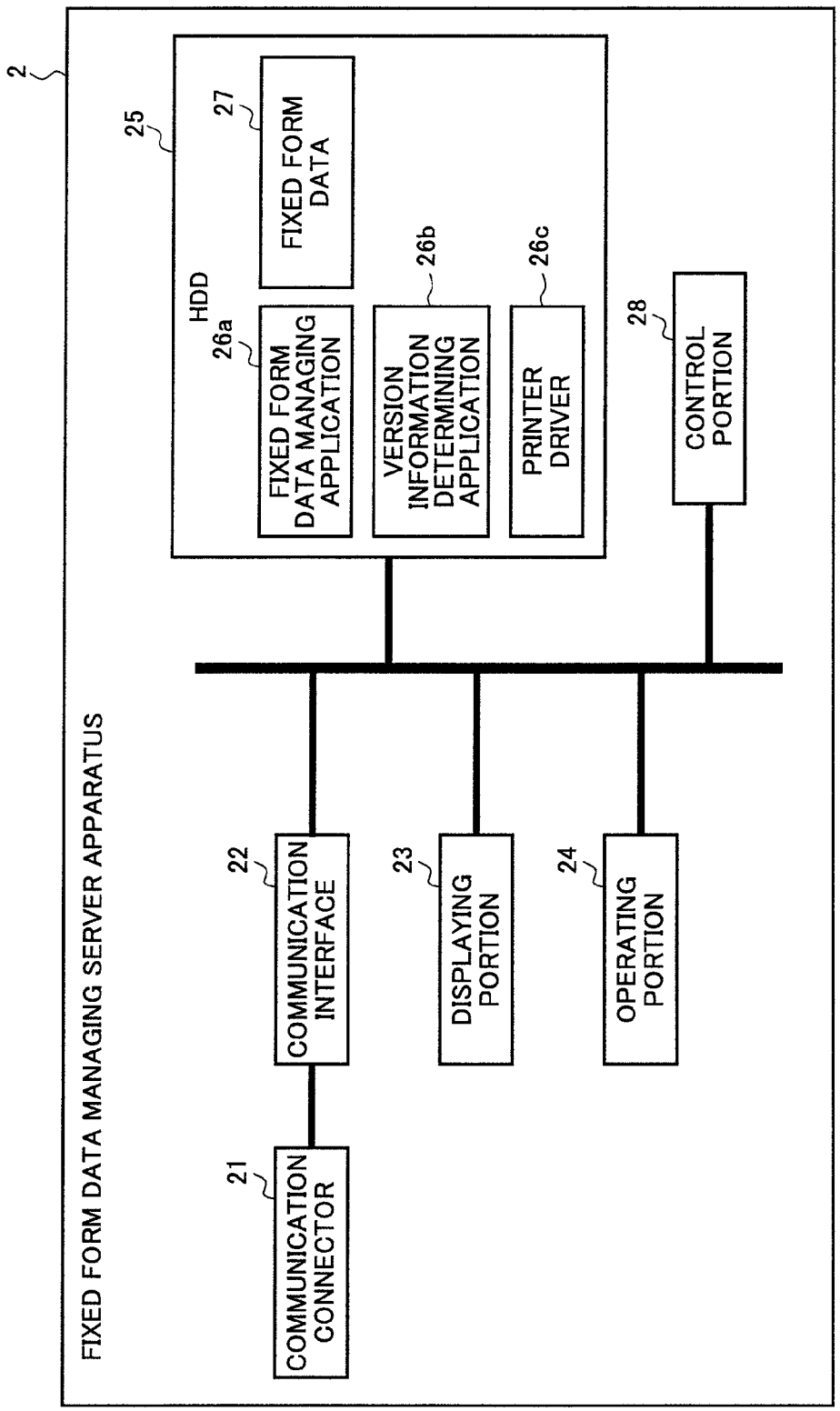
FIG. 7 is a functional block diagram of a fixed form data managing server apparatus.

FIG. 7 is a functional block diagram of the fixed form data managing server apparatus 2 according to the present invention. "21" denotes a communication connector. "22" denotes a communication interface. "23" denotes a displaying portion. "24" is an operating portion.

"25" denotes an HDD (recording portion) that functions as a large-capacity recording apparatus and that has recorded therein an application that manages the fixed form data described later, etc.

In this case, it is assumed that the HDD 25 has recorded therein the fixed form data that is attached with the latest version information transmitted from the fixed form data creating PC 1.

"26a" denotes a fixed form data managing application that executes management of information concerning the fixed form data, and various information processes concerning the data.

"26b" denotes a version information determining application (determining portion) that receives through the communication interface 22 (communication connector 21) the version information of the fixed form data transmitted from the PC 3, that compares the version information with the version information attached to the fixed form data 27 recorded in the HDD 25 (the latest version information recorded in the version information recording area 113 of the fixed form data 27), that is, the latest version information, and that determines whether the version information is the latest version information.

When the version information determining application 26b determines that the version information transmitted from the PC 3 is not the latest version information, the fixed form data managing application 26a transmits to the PC 3 control information to stop the printing of the document data concerning the version information.

Figure 8:
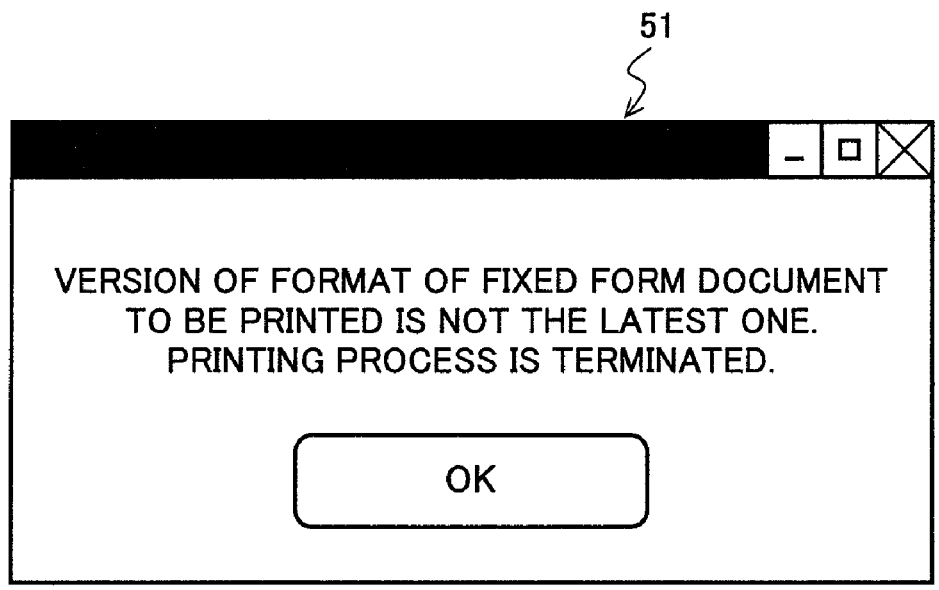
FIG. 8 is an example of a dialogue.

The document data creating application 36a of the PC receives the control information and displays on the displaying portion 33 a dialogue 51 that informs the user that the fixed form data included in the document data to be printed exemplified in FIG. 8 is not that of the latest version.

When the version information determining application 26b determines that the version information transmitted from the PC 3 is the latest version information, the fixed form data managing application 26a transmits to the PC 3 control signal (control information) to permit the printing of the document data concerning the version information.

The document data creating application 36a of the PC 3 receives the control information and orders the printer driver 36b to create data for the printing that corresponds to the document data and transmit the data to the image forming apparatus 5.

The printer driver 36b receives the order, creates the data for the printing, and transmits the data to the image forming apparatus 5.

"26c" denotes a printer driver. The fixed form data 27 is the fixed form data uploaded (registered) from the fixed form data creating PC 1. The fixed form data 27 is updated when necessary and is attached with the latest version information.

The fixed form data managing application 26a, the version information determining application 26b, the printer driver 26c, the fixed form data 27 are recorded in the HDD 25.

"28" denotes a control portion that includes a CPU, a ROM, a RAM, etc., and that controls the respective functional blocks. The CPU controls a process of reading the fixed form data managing application 26a, the version information determining application 26b and the printer driver 26c into the RAM and executing the applications and the driver.

Figure 9:
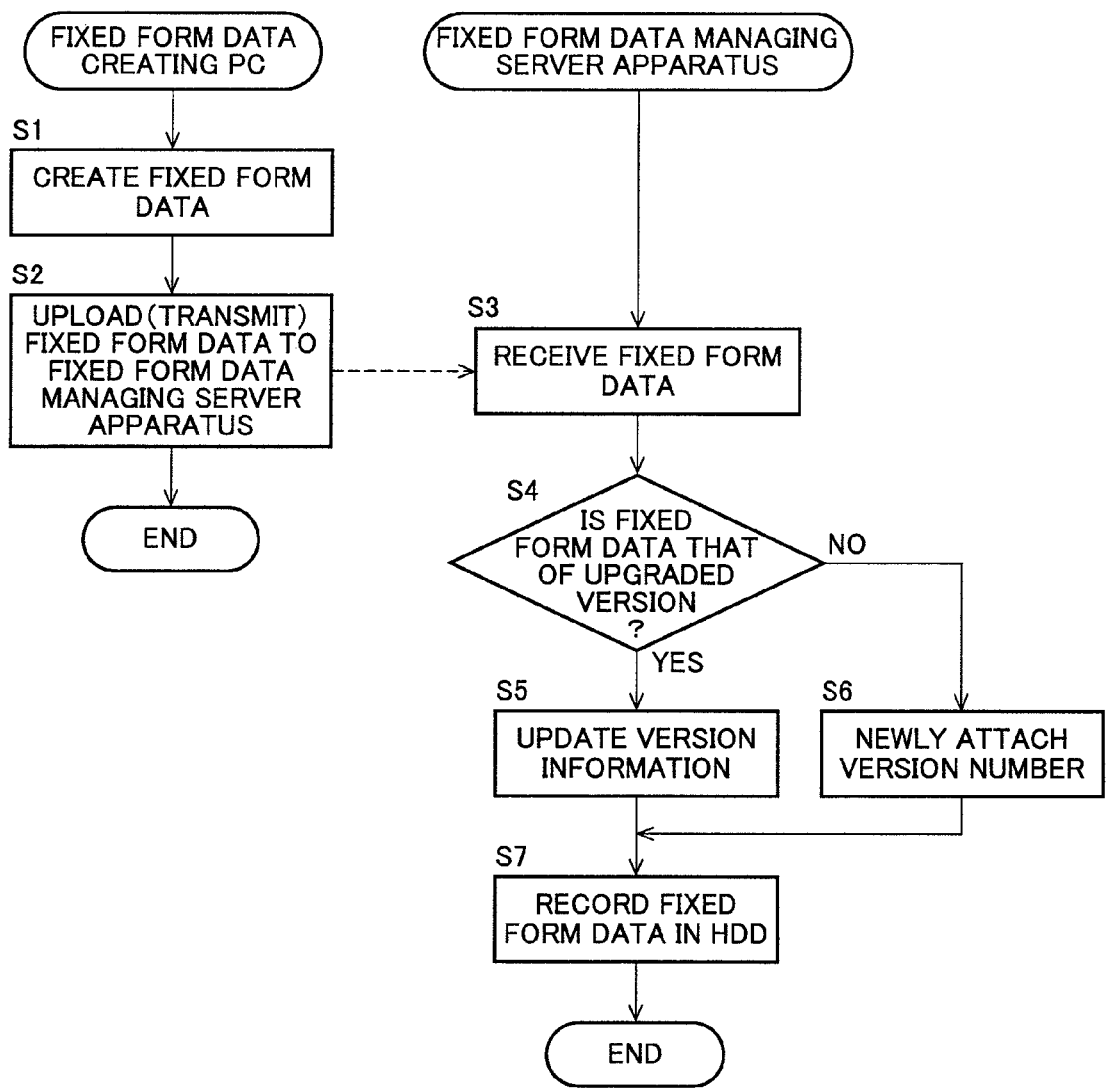
FIG. 9 is an explanatory flowchart of a process of registering the fixed form data into the fixed form data managing server apparatus.

A process of registering (uploading) the fixed form data created by the fixed form data creating PC 1 into the fixed form data managing server apparatus 2 will be described in detail with reference to a flowchart depicted in FIG. 9.

A manager executes the fixed form data creating application 16a of the fixed form data creating PC 1 and, thereby, creates the fixed form data that is exemplified in FIGS. 3 and 4A to 4C (step S1).

When the manager orders the fixed form data registering application 16b to upload the fixed form data created into the fixed form data managing server apparatus 2, the application 16b uploads (transmits) the fixed form data to the fixed form data managing server apparatus 2 (step S2).

When the fixed form data managing server apparatus 2 receives the fixed form data transmitted by the fixed form data creating PC 1 (step S3), the fixed form data managing application 26a determines whether the fixed form data is the data that has been created by updating or modifying the existing fixed form data, that is, fixed form data of an upgraded version, or is new fixed form data that has been only newly created but by upgrading the version, based on the name recorded in the fixed form data name recording area 112 of the fixed form data (file), etc. (step S4).

An example of the determining method at step S4 can be a method of determining that the fixed form data is the fixed form data of an upgraded version when the name of the fixed form data already recorded in the HDD 25 and the name of the fixed form data received at step S3 are same, and determining that new fixed form data has been created when those names are different from each other. Those names are recorded in the fixed form data name recording area 112 of the fixed form data.

When it is determined that the fixed form data received is the fixed form data of the upgraded version (step S4/YES), version information that is updated based on the version information of the existing document data is recorded in the version information recording area 113 of the fixed form data received (step S5). For example, when the version information of the existing document data is "Seikyusho_Ver1.00", the version information is updated to "Seikyusho_Ver1.01".

When it is determined that the fixed form data received is the new fixed form data but the fixed form data of an upgraded version (step S4/NO), the version information that is newly attached with is recorded in the version information recording area 113 of the fixed form data received (step S6). In this case, for example, "Ryousyusho_Ver1.00" is recorded.

The fixed form data is recorded in the HDD 25 (step S7).

In this manner, when the manager executes the process of registering the fixed form data, the work load to manage the versions may be reduced and the convenience for the user may be improved because the version number is automatically updated and attached with.

A process of determining whether the fixed form data included in the document data to be printed is that of the latest version with reference to the version information, and transmitting to the PC a control signal indicating permission or rejection of the printing will be described in detail with reference to a flowchart depicted in FIG. 10.

In this case, it is assumed that the HDD 35 of the PC 3 has recorded therein the fixed form data downloaded from the fixed form data managing server apparatus 2 and that the HDD 25 of the fixed form data managing server apparatus 2 has recorded therein one type of latest fixed form data (file).

The user executes the document data creating application 36a of the PC 3 and, thereby, creates the document data (see FIG. 6) based on the fixed form data (see FIG. 3) downloaded (step S11).

When the user orders to print the document data created, the document data creating application 36a transmits the version information recorded in the version information recording area 113 of the fixed form data included in the document data to the fixed form data managing server apparatus 2 prior to the printing process (transmission of the data to be printed to the printing server apparatus 4 and the image forming apparatus 5) (step S12).

The version information determining application 26b of the fixed form data managing server apparatus 2 receives the version information through the communication interface 22 (step S13) and determines whether the version information is the latest version information (step S14).

When it is determined that the version information is the latest version information (step S14/YES), the fixed form data managing application 26a transmits to the PC 3 control information to permit the printing of the document data concerning the version information (permission of the printing) (step S15).

When it is determined at step S14 that the version information is not the latest version information (step S14/NO), the fixed form data managing application 26a transmits to the PC 3 control information to stop the printing of the document data concerning the version information (stop of the printing) (step S16).

When the PC 3 receives the control information transmitted by the fixed form data managing server apparatus 2 (step S17), the document data creating application 36a of the PC 3 determines whether the control information received is the control information to permit the printing (step S18).

When the PC 3 receives the control information to permit the printing (step S18/YES (permission of the printing)), the printer driver 36b of the PC 3 creates data for the printing that corresponds to the document data concerning the version information and transmits the data to the image forming apparatus 5 (step S19).

When the PC 3 receives the control information to stop the printing (step S18/NO (stop of the printing)), the document data creating application 36a of the PC 3 displays the dialogue 51 exemplified in FIG. 8 (step S20). In this case, the printing may also be adapted to be executed when the user desires to do so.

In this manner, the check on the version of the fixed form data that conventionally is manually executed may automatically be executed and, therefore, the work load on the user may be reduced and the convenience for the user may be improved. A dialogue indicating that the version is not the latest version is displayed on the displaying portion of the PC and, therefore, the convenience for the user may be improved.

Second Embodiment

In this embodiment, the fixed form data managing server apparatus 2 will be described, that transmits the control information to stop the printing of the document data and that further transmits recording destination information (URL) of the fixed form data attached with the latest version information recorded in the HDD 25 or the fixed form data attached with the latest version information recorded in the HDD 25.

The fixed form data managing application 26a of the fixed form data managing server apparatus 2 executes the above transmitting process of the recording destination information (URL) of the fixed form data attached with the latest version information or the fixed form data attached with the latest version information. The recording destination information is recorded in the HDD 35 together with the fixed form data.

Figure 11A:
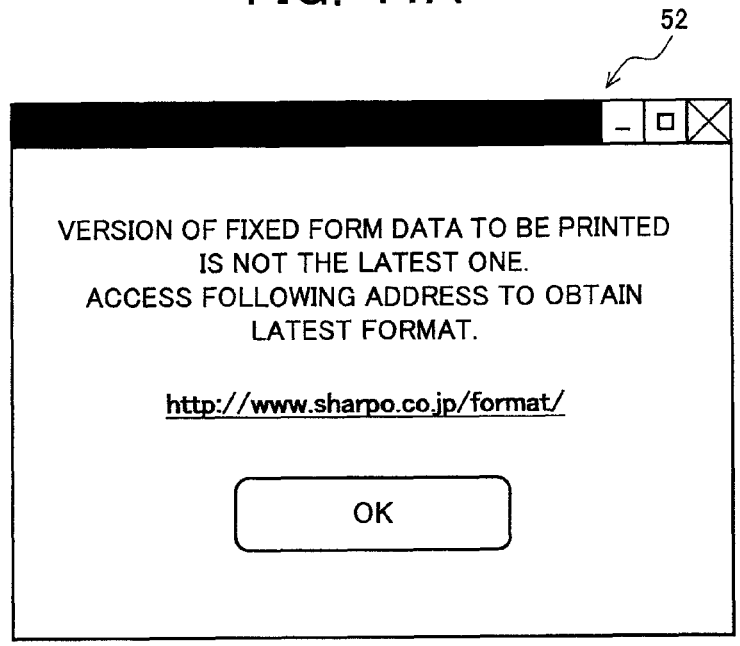
FIGS. 11A and 11B are diagrams of other examples of the dialogue.

FIG. 11A depicts an example of a dialogue 52 that is displayed on the displaying portion 33 of the PC 3 when the PC 3 receives the recording destination information of the fixed form data attached with the latest version information recorded in the HDD 35 transmitted by the fixed form data managing server apparatus 2 of the second embodiment.

The dialogue 52 indicates that the fixed form data included in the document data to be printed is not the fixed form data of the latest version, and also indicates the recording destination information (URL) of the latest fixed form data. Therefore, the user may download the latest fixed form data into the PC 3 by accessing the URL.

Figure 11B:
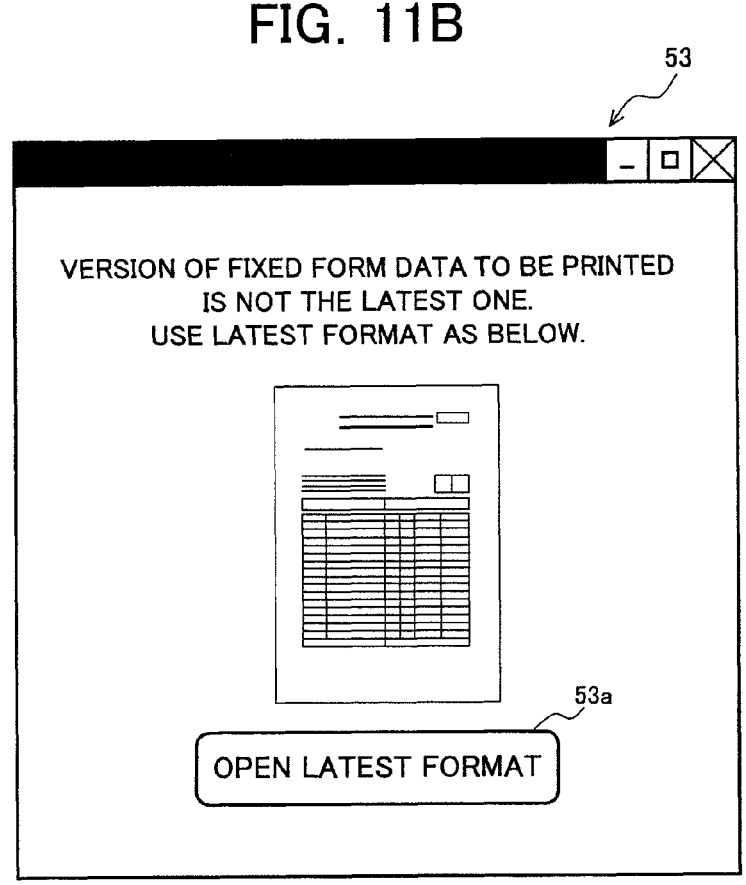

FIG. 11B depicts an example of a dialogue 53 that is displayed on the displaying portion 33 of the PC 3 when the PC 3 receives the fixed form data attached with the latest version information recorded in the HDD 35 transmitted by the fixed form data managing server apparatus 2 of the second embodiment.

The dialogue 53 indicates that the fixed form data included in the document data to be printed is not the fixed form data of the latest version, and is provided with a button 53a.

When the user operates the button 53a through the mouse, etc., of the operating portion 34, the document data creating application 36a opens (displays) the latest fixed form data received and causes this data to be editable.

A process of displaying the above dialogues will be described in detail with reference to a flowchart depicted in FIG. 12.

Figure 10:
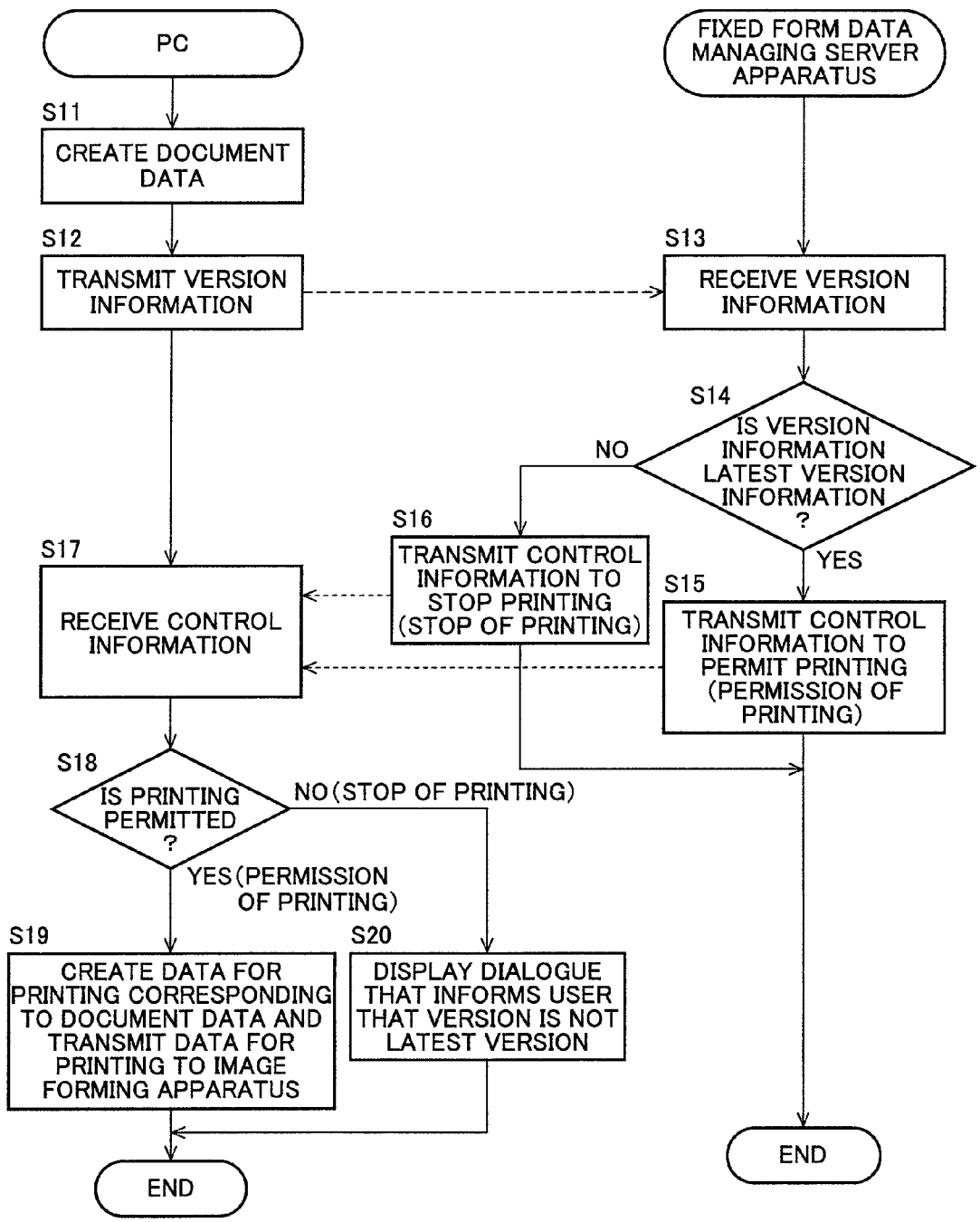
FIG. 10 is an explanatory flowchart of a process of referring to version information, determining whether the fixed form data included in document data to be printed is that of the latest version, and transmitting a control signal indicating permission or rejection of printing to a PC.

Processes at steps S31 to S35 and S39 are same as those at steps S11 to S15 and S19 of FIG. 10 and, therefore, the description thereof is omitted.

When the processes at steps S31 to S33 are executed and it is determined at step S34 that the version information is not the latest version information (step S34/NO), the fixed form data managing application 26a transmits to the PC 3 control information to stop the printing, and recording destination information (URL) of the fixed form data attached with the latest version information recorded in the HDD 25 (step S36).

When the PC 3 receives the control information transmitted by the fixed form data managing server apparatus 2 (step S37), the document data creating application 36a of the PC 3 determines whether the control information received is control information to permit the printing (step S38).

When the PC 3 receives control information to stop the printing (step S38/NO (stop of printing)), the document data creating application 36a of the PC 3 creates the dialogue 52 depicted in FIG. 11A based on the recording destination information transmitted together with the control information, and displays the dialogue 52 on the displaying portion 33 (step S40).

By executing as above, the user need not search by him/herself for the recording destination of the fixed form data attached with the latest version information, and may easily access and download the fixed form data attached with the latest version information.

As a result, the work load on the user may be reduced and the convenience for the user may be improved.

Figure 12:
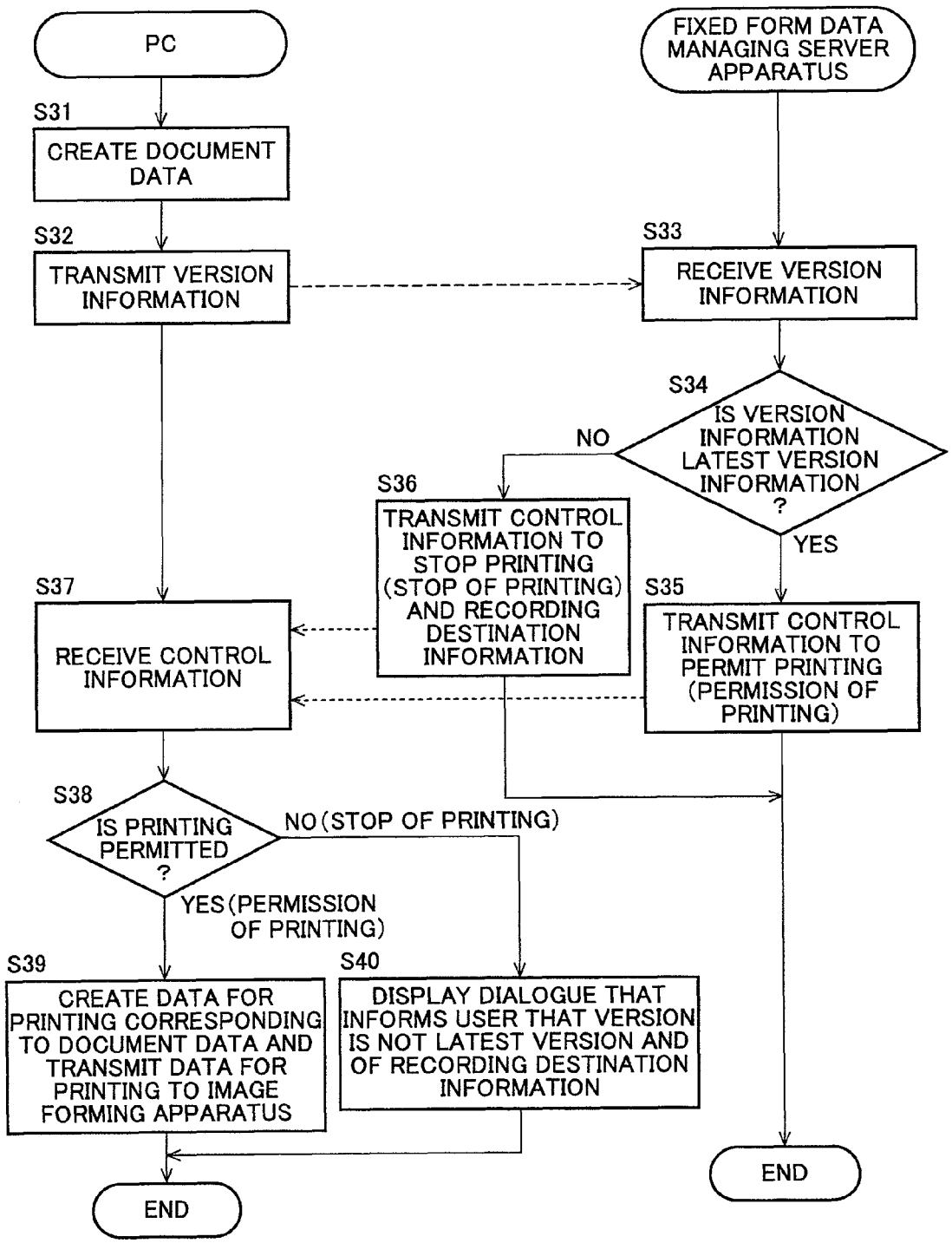
FIG. 12 is an explanatory flowchart of a process of displaying dialogues.

At step S36 of FIG. 12, the fixed form data attached with the latest version information may also be transmitted to the PC 3 instead of the recording destination information (URL) of the fixed form data attached with the latest version information.

The PC 3 receives the fixed form data, records the fixed form data into the HDD 35, finishes the determination process at step S38, creates the dialogue 53 depicted in FIG. 11B, and displays the dialogue 53 on the displaying portion 33 (see step S39).

By executing as above, the fixed form data attached with the latest version information may immediately be used.

As a result, the work load on the user may be reduced and the convenience for the user may be improved.

The fixed form data attached with the latest version information may also be transmitted only when the PC 3 receives the control information to stop the printing, and requests the fixed form data managing server apparatus 2 to transmit the fixed form data attached with the latest version information. By executing as this, transmission and reception of unnecessary data may be suppressed.

Third Embodiment

In a third embodiment, a fixed form data managing server apparatus 2 that, when document data is created based on the fixed form data that is not that of the latest version, executes a process of replacing the fixed form data in the document data with the fixed form data attached with the latest version information will be described.

Any one of various approaches that are conventionally proposed may be used for the above process of replacing the fixed form data.

Figure 13:
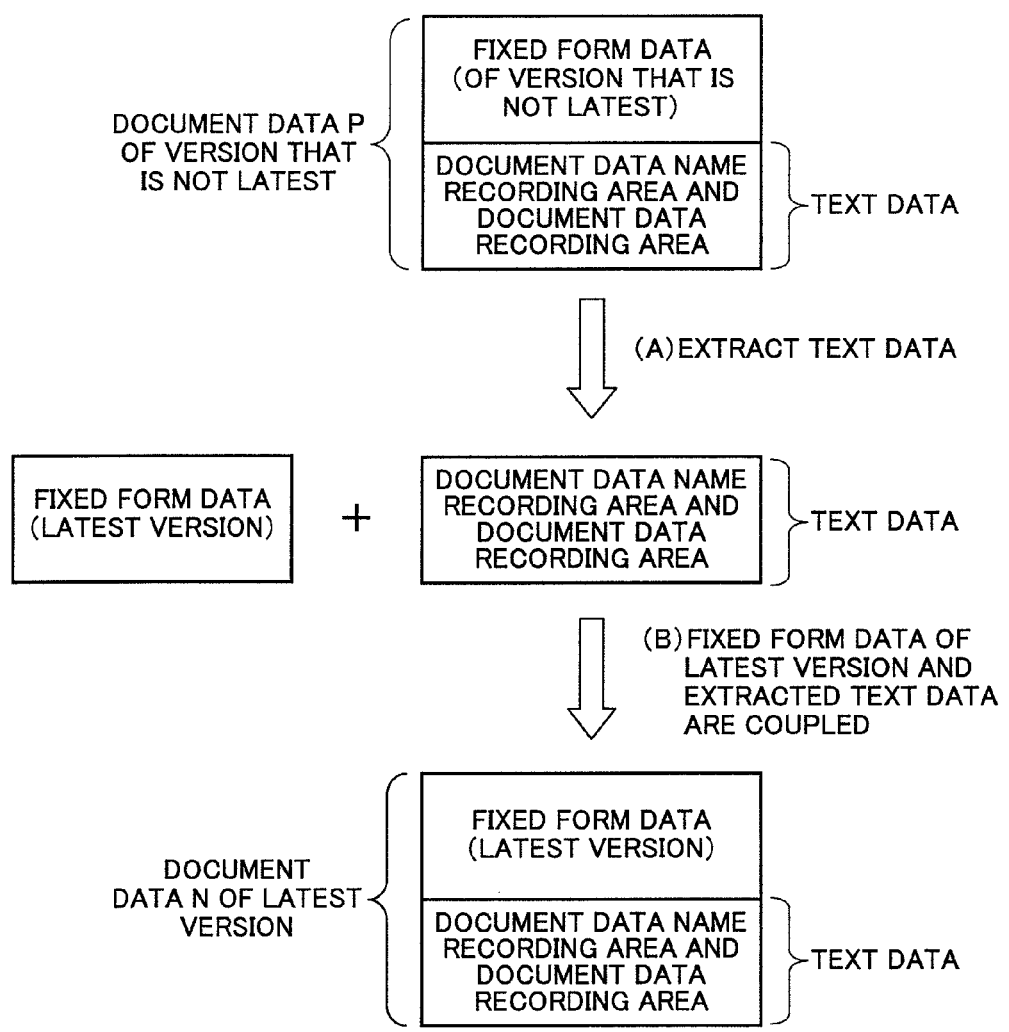
FIG. 13 is an explanatory diagram of a fixed form data replacing process.

FIG. 13 is an explanatory diagram of an example of the above approach.

When the version information transmitted from the PC 3 is not the latest version information, the fixed form data managing application 26a of the fixed form data managing server apparatus 2 transmits to the PC 3 a signal to request the PC to transmit document data P concerning the version information that is not the latest version information.

When the document data creating application 36a of the PC 3 transmits the document data P in response to the request, the fixed form data managing application 26a of the fixed form data managing server apparatus 2 receives the document data P and, as depicted in (A) of FIG. 13, extracts pieces of text data in the document data name recording area 212 and the document data recording area 213 of the data P.

As depicted in (B) of FIG. 13, the fixed form data managing server apparatus 2 couples the fixed form data of the latest version information recorded in the HDD 25 of the fixed form data managing server apparatus 2 and the pieces of text data extracted (replaces the fixed form data in the document data transmitted from the PC 3 with the fixed form data attached with the latest version information recorded in the HDD 25) and newly creates document data N of the latest version. The apparatus 2 transmits the document data N created newly to the PC 3.

The above replacing process will be described in detail with reference to a flowchart depicted in FIG. 14.

The processes at steps S51 to S55 are same as the processes at steps S11 to S15 of FIG. 10 and, therefore, the description thereof is omitted.

When the processes at steps S51 to S53 are executed and it is determined at step S54 that the version information is not the latest version information (step S54/NO), the fixed form data managing application 26a of the fixed form data managing server apparatus 2 transmits to the PC 3 control information to request transmission of document data created by the PC 3 instead of the control information to stop the printing of the document data (a request signal) (step S56).

When the PC 3 receives the control information transmitted by the fixed form data managing server apparatus 2 (step S57), the document data creating application 36a of the PC 3 determines whether the control information received is control information to permit the printing (step S58).

When the PC 3 receives the control information for requesting transmission of the document data (step S58/NO (transmission request)), the document data creating application 36a of the PC 3 transmits document data created based on the fixed form data that is not that of the latest version to the fixed form data managing server apparatus 2 (step S60).

The fixed form data managing application 26a of the fixed form data managing server apparatus 2 receives the document data and transmits to the PC 3 document data formed by replacing the fixed form data in the document data with the fixed form data attached with the latest version information recorded in the HDD 25 (step S61).

The PC 3 receives the document data of the latest version (step S62) and, thereafter, the printer driver 36b creates data for printing that corresponds to the document data and transmits the created data to the image forming apparatus 5 (step S59).

By executing as above, the document data based on the fixed form data attached with the latest version information is automatically created. As a result, the work load on the user may be reduced and the convenience for the user may be improved.

(Additionally)

When the processing load is reduced using the printing server apparatus 4, the printer driver 36b of the PC 3 creates data for printing based on the document data created and transmits the data together with control information to request to print, to the printing server apparatus 4. The document data creating application 36a of the PC 3 transmits the version information recorded in the version information recording area 113 of the fixed form data included in the document data together with the data, to the printing server apparatus 4.

The printing server apparatus 4 receives the above pieces of data, temporarily has stored therein the data for printing, extracts the version information received, and transmits the version information to the fixed form data managing server apparatus 2.

The fixed form data managing server apparatus 2 receives the version information, executes the above determining process, and transmits control information to the printing server apparatus 4.

The printing server apparatus 4 receives the control information. When the control information is the control information to permit the printing of the document data according to the version information (permission of the printing), the printing server apparatus 4 transmits the data for the printing that the apparatus 4 temporarily has stored therein, to the image forming apparatus 5.

On the other hand, when the control information is the control information to stop the printing of the document data (stop of the printing), the printing server apparatus 4 deletes the data for the printing that the apparatus 4 temporarily has stored therein, and transfers the control information to the PC 3.

At this time, as in the second embodiment, when the fixed form data managing server apparatus 2 transmits the recording destination information (URL) or the fixed form data attached with the latest version information recorded in the HDD 25, the printing server apparatus 4 transfers the recording destination information and the fixed form data to the PC 3.

In the third embodiment, when the printing server apparatus 4 receives the control information to request transmission of the document data created by the PC 3, the server apparatus 4 transmits the document data that the server apparatus 4 temporarily has stored therein to the fixed form data managing server apparatus 2.

Thereafter, as above, the fixed form data managing server apparatus 2 transmits the document data configured by the fixed form data attached with the latest version information, to the printing server apparatus 4. The printing server apparatus 4 receives the document data and transmits the document data to the image forming apparatus 5.

When the fixed form data managing server apparatus 2 receives the version information of the fixed form data, the apparatus 2 may also obtain from the image forming apparatus the performance information of the image forming apparatus 5 designated by the PC 3 as the output destination of the fixed form data, determine whether the image forming apparatus 5 may execute the printing conditions set for the fixed form data, by referring to the performance information, and, thereafter, transmit the determination result to the PC 3. For example, when the image forming apparatus 5 prints document data for which a color mode is set as its printing condition, the fixed form data managing server apparatus 2 obtains performance information (for example, ability to print in the color mode) of the image forming apparatus 5 from the image forming apparatus 5 and transmits to the PC 3 the determination result indicating that the image forming apparatus 5 may print in the color mode. When the image forming apparatus 5 may only print in monochrome, the apparatus 2 transmits to the PC 3 the determination result indicating that the image forming apparatus 5 may not print in the color mode.

By executing as above, printing the document data using an image forming apparatus that is not adapted to print the document data may be prevented.

Though the version information of the fixed form data is transmitted to the fixed form data managing server apparatus 2 before the printing in the above embodiment, the transmission may be executed before the creation of the document data and the timing for the transmission is not limited.

Though the personal computer has been exemplified as an example of the information processing apparatus, a facsimile apparatus or a facsimile server apparatus (hereinafter, simply "facsimile apparatus") may otherwise be used.

In the case where the information processing apparatus is a facsimile apparatus, when the facsimile apparatus receives the document data, the facsimile apparatus transmits the version information of the fixed form data included in the document data to the fixed form data managing server apparatus 2.

The fixed form data managing server apparatus 2 receives the version information, executes the above processes, and transmits the determination result to the facsimile apparatus. The apparatus 2 may transmit the determination result to the PC 3.

According to the present invention, a check on the version of fixed form data may automatically be executed and, therefore, the work load on a user may be reduced. A dialogue indicating that the version is not the latest one is displayed on the displaying portion of a PC and, therefore, convenience for the user may be improved.

The invention claimed is:

1. A fixed form document creating system comprising:
a fixed form data managing server apparatus in a fixed form creating system comprising a fixed form data managing server apparatus that manages fixed form data constituting a fixed form attached with version information and having various input items set therein, and an information processing apparatus that transmits document data into which text data corresponding to the various input items of the fixed form data is input based on the fixed form data, comprising:
    a recording portion that has recorded therein the fixed form data attached with the version information and updated when necessary; and
    a determining portion that compares version information of the fixed form data transmitted from the information processing apparatus with the version information attached to the fixed form data recorded in the recording portion and that determines whether the version information of the fixed form data transmitted from the information processing apparatus is the version information attached to the fixed form data recorded in the recording portion, wherein
    when the determining portion determines that the version information of the fixed form data transmitted from the information processing apparatus is not the version information attached to the fixed form data recorded in the recording portion, the fixed form data managing server apparatus transmits control information to stop printing of the document data to the information processing apparatus; and
an information processing apparatus that has a function of transmitting document data created based on fixed form data, the information processing apparatus transmitting version information of the fixed form data to the fixed form data managing server apparatus, wherein
    the fixed form data managing server apparatus and the information processing apparatus are connected to each other through a network.

2. The fixed form document creating system as defined in claim 1, wherein
the fixed form data managing server apparatus transmits the control information to stop the printing of the document data to the information processing apparatus and further transmits recording destination information of the fixed form data recorded in the recording portion or the fixed form data recorded in the recording portion to the information processing apparatus.

3. The fixed form document creating system as defined in claim 1, wherein
when the determining portion determines that the version information of the fixed form data transmitted from the information processing apparatus is not the version information attached to the fixed form data recorded in the recording portion, the fixed form data managing server apparatus transmits to the information processing apparatus control information to request the information processing apparatus to transmit the document data created based on the fixed form data instead of the control information to stop the printing of the document data, replaces the fixed form data in the document data transmitted from the information processing apparatus with the fixed form data attached with the version information recorded in the recording portion, and transmits the replaced fixed form data to the information processing apparatus.

4. The fixed form document creating system as defined in claim 1, wherein
when the determining portion receives the version information of the fixed form data, the determining portion obtains performance information of an image forming apparatus that is designated as an output destination of the document data concerning the fixed form data from the image forming apparatus, determines whether the image forming apparatus is capable of executing printing conditions set for the document data concerning the fixed form data by referring to the performance information, and, thereafter, transmits the determination result to the information processing apparatus.

5. The fixed form document creating system as defined in claim 1, wherein the information processing apparatus that has received the control information to stop the printing of the document data transmitted by the fixed form data managing server apparatus displays a dialogue to inform a user that the fixed form data included in the document data is not that of the latest version.

6. The fixed form document creating system as defined in claim 5, wherein the information processing apparatus is configured by a personal computer or a facsimile apparatus.

7. The fixed form document creating system as defined in claim 1, wherein the information processing apparatus is configured by a personal computer or a facsimile apparatus.

\* \* \* \* \*